United States Patent
Chowdhury

(10) Patent No.: US 10,165,487 B2
(45) Date of Patent: Dec. 25, 2018

(54) APPARATUS, SYSTEMS, AND METHODS FOR PROVIDING OFFLOADING TO AN ALTERNATE NETWORK

(71) Applicant: Cicso Technology, Inc., San Jose, CA (US)

(72) Inventor: Kuntal Chowdhury, Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/268,286

(22) Filed: May 2, 2014

(65) Prior Publication Data

US 2014/0241153 A1    Aug. 28, 2014

Related U.S. Application Data

(63) Continuation of application No. 12/853,125, filed on Aug. 9, 2010, now Pat. No. 8,743,696.
(Continued)

(51) Int. Cl.
*H04W 36/22*        (2009.01)
*H04L 12/715*       (2013.01)
(Continued)

(52) U.S. Cl.
CPC ............ *H04W 36/22* (2013.01); *H04L 45/04* (2013.01); *H04L 45/22* (2013.01); *H04L 45/306* (2013.01)

(58) Field of Classification Search
CPC ......... H04L 47/11; H04L 47/127; H04L 47/10
See application file for complete search history.

(56) References Cited

U.S. PATENT DOCUMENTS

| 5,717,690 A | 2/1998 | Peirce, Jr. et al. |
| 5,898,713 A | 4/1999 | Melzer et al. |

(Continued)

FOREIGN PATENT DOCUMENTS

| EP | 1250022 A1 | 10/2002 |
| EP | 1587271    | 10/2005 |

(Continued)

OTHER PUBLICATIONS

"Stoke: Stoke Mobile Data Offload Solution Brief." Stoke, Inc., Aug. 2009. 4 pages.
(Continued)

*Primary Examiner* — Lonnie Sweet
*Assistant Examiner* — Prenell Jones
(74) *Attorney, Agent, or Firm* — Patterson + Sheridan, LLP

(57) ABSTRACT

This disclosure relates to a system and method for offloading selected data to an alternate communication network. The offloading provides another route for selected packet traffic that can relieve the burden on a mobile operator's network, such as the backhaul and core networks. As the proliferation of data rich content and increasingly more capable mobile devices has continued, the amount of data communicated over mobile operator's networks has exponentially increased. Upgrading the existing network that was designed for voice calls is not desirable or practical for many mobile operators. This disclosure provides systems and methods for offloading data to the Internet or another IP network to relieve congestion on the mobile operator's network.

20 Claims, 11 Drawing Sheets

Related U.S. Application Data

(60) Provisional application No. 61/257,712, filed on Nov. 3, 2009, provisional application No. 61/246,118, filed on Sep. 26, 2009, provisional application No. 61/232,213, filed on Aug. 7, 2009.

(51) Int. Cl.
*H04L 12/707* (2013.01)
*H04L 12/725* (2013.01)

(56) References Cited

U.S. PATENT DOCUMENTS

| | | |
|---|---|---|
| 6,157,649 A | 12/2000 | Peirce et al. |
| 6,522,880 B1 | 2/2003 | Verma et al. |
| 6,643,621 B1 | 11/2003 | Dodrill et al. |
| 6,654,792 B1 | 11/2003 | Verma et al. |
| 6,738,362 B1 | 5/2004 | Xu et al. |
| 6,763,018 B1 | 7/2004 | Puthiyandyil et al. |
| 6,917,592 B1 | 7/2005 | Ramankutty et al. |
| 6,922,411 B1 | 7/2005 | Taylor |
| 7,340,744 B2 | 3/2008 | Chandwadkar et al. |
| 7,362,776 B2 | 4/2008 | Meier et al. |
| 7,415,523 B2 | 8/2008 | O'Rourke et al. |
| 7,426,213 B2 | 9/2008 | Xu et al. |
| 7,792,113 B1 | 9/2010 | Foschiano et al. |
| 7,808,919 B2 | 10/2010 | Nadeau et al. |
| 7,827,256 B2 | 11/2010 | Phillips et al. |
| 7,856,512 B2 | 12/2010 | Hilla et al. |
| 7,885,248 B2 | 2/2011 | Harper et al. |
| 7,885,260 B2 | 2/2011 | Paul et al. |
| 7,890,636 B2 | 2/2011 | Grayson et al. |
| 7,929,973 B2 | 4/2011 | Zavalkovsky et al. |
| 8,036,665 B2 | 10/2011 | Shah |
| 8,064,909 B2 | 11/2011 | Spinelli et al. |
| 8,064,948 B2 | 11/2011 | Meier et al. |
| 8,103,310 B1 * | 1/2012 | Srinivas et al. ............ 455/561 |
| 2003/0028644 A1 | 2/2003 | Maguire et al. |
| 2004/0088385 A1 | 5/2004 | Blanchet et al. |
| 2004/0136337 A1 | 7/2004 | Warrier et al. |
| 2004/0224678 A1 | 11/2004 | Dahod et al. |
| 2004/0236855 A1 | 11/2004 | Peles |
| 2005/0078691 A1 | 4/2005 | Davison et al. |
| 2005/0091371 A1 | 4/2005 | Delegue et al. |
| 2005/0148368 A1 | 7/2005 | Scheinert et al. |
| 2005/0186948 A1 | 8/2005 | Gallagher et al. |
| 2005/0239473 A1 | 10/2005 | Pan et al. |
| 2005/0286504 A1 | 12/2005 | Kwon |
| 2006/0018328 A1 | 1/2006 | Mody et al. |
| 2006/0067273 A1 | 3/2006 | Suman et al. |
| 2006/0187873 A1 | 8/2006 | Friday et al. |
| 2006/0227705 A1 | 10/2006 | Chandwadkar et al. |
| 2006/0234678 A1 | 10/2006 | Juitt et al. |
| 2006/0268901 A1 | 11/2006 | Choyi et al. |
| 2006/0291388 A1 | 12/2006 | Amdahl et al. |
| 2007/0097983 A1 | 5/2007 | Nylander et al. |
| 2007/0105568 A1 | 5/2007 | Nylander et al. |
| 2007/0116019 A1 | 5/2007 | Cheever et al. |
| 2007/0116020 A1 | 5/2007 | Cheever et al. |
| 2007/0140181 A1 * | 6/2007 | Channegowda et al. ..... 370/338 |
| 2007/0183427 A1 | 8/2007 | Nylander et al. |
| 2007/0243872 A1 | 10/2007 | Gallagher et al. |
| 2007/0253328 A1 | 11/2007 | Harper et al. |
| 2007/0253371 A1 | 11/2007 | Harper et al. |
| 2008/0137541 A1 | 6/2008 | Agarwal et al. |
| 2008/0162637 A1 | 7/2008 | Adamczyk et al. |
| 2008/0176582 A1 | 7/2008 | Ghai et al. |
| 2008/0188223 A1 | 8/2008 | Vesterinen et al. |
| 2008/0298309 A1 | 12/2008 | DePietro et al. |
| 2008/0310404 A1 | 12/2008 | Valme et al. |
| 2008/0316980 A1 | 12/2008 | Ahlen et al. |
| 2008/0317053 A1 | 12/2008 | Panda et al. |
| 2009/0017864 A1 | 1/2009 | Keevill et al. |
| 2009/0061821 A1 | 3/2009 | Chen et al. |
| 2009/0061873 A1 | 3/2009 | Bao et al. |
| 2009/0067417 A1 | 3/2009 | Kalavade et al. |
| 2009/0070176 A1 * | 3/2009 | Altice et al. ............ 705/8 |
| 2009/0086742 A1 | 4/2009 | Ghai et al. |
| 2009/0089447 A1 | 4/2009 | Balachandran et al. |
| 2009/0098872 A1 | 4/2009 | Deshpande et al. |
| 2009/0129271 A1 | 5/2009 | Rarnankutty et al. |
| 2009/0129341 A1 | 5/2009 | Balasubramanian et al. |
| 2009/0141625 A1 | 6/2009 | Ghai et al. |
| 2009/0156213 A1 * | 6/2009 | Spinelli et al. .......... 455/436 |
| 2009/0163223 A1 | 6/2009 | Casey |
| 2009/0196253 A1 | 8/2009 | Semper |
| 2009/0207759 A1 * | 8/2009 | Andreasen et al. ........ 370/259 |
| 2009/0213825 A1 * | 8/2009 | Gupta .............. H04W 48/02 370/338 |
| 2009/0215438 A1 | 8/2009 | Mittal et al. |
| 2009/0262682 A1 | 10/2009 | Khetawat et al. |
| 2009/0285225 A1 | 11/2009 | Dahod |
| 2009/0286510 A1 | 11/2009 | Huber et al. |
| 2009/0298470 A1 | 12/2009 | Huber et al. |
| 2010/0027448 A1 | 2/2010 | Puthiyandyil et al. |
| 2010/0039978 A1 | 2/2010 | Rangan |
| 2010/0039993 A1 | 2/2010 | Rarnankutty et al. |
| 2010/0041373 A1 | 2/2010 | Rarnankutty et al. |
| 2010/0077102 A1 | 3/2010 | Lim et al. |
| 2010/0085978 A1 | 4/2010 | Rarnankutty et al. |
| 2010/0091653 A1 | 4/2010 | Koodli et al. |
| 2010/0124933 A1 | 5/2010 | Chowdhury et al. |
| 2010/0128708 A1 | 5/2010 | Liu et al. |
| 2010/0195640 A1 | 8/2010 | Park et al. |
| 2010/0203890 A1 | 8/2010 | Nagaraja et al. |
| 2010/0238868 A1 | 9/2010 | Melpignano et al. |
| 2010/0261478 A1 * | 10/2010 | Schmidt et al. ............ 455/445 |
| 2010/0272031 A1 * | 10/2010 | Grayson et al. ............ 370/329 |
| 2010/0291897 A1 | 11/2010 | Ghai |
| 2010/0296499 A1 | 11/2010 | Karaoguz et al. |
| 2011/0021192 A1 | 1/2011 | Grayson et al. |
| 2011/0021196 A1 | 1/2011 | Grayson et al. |
| 2011/0058479 A1 | 3/2011 | Chowdhury |
| 2011/0075557 A1 | 3/2011 | Chowdhury et al. |
| 2011/0075675 A1 | 3/2011 | Koodli et al. |
| 2011/0185049 A1 | 7/2011 | Atreya et al. |
| 2011/0268007 A1 | 11/2011 | Barany et al. |
| 2012/0087298 A1 | 4/2012 | Garavaglia et al. |
| 2012/0100821 A1 | 4/2012 | Dan et al. |
| 2012/0135719 A1 * | 5/2012 | Haughn ................. 455/414.1 |
| 2012/0163179 A1 | 6/2012 | Jo et al. |
| 2012/0166618 A1 | 6/2012 | Dahod et al. |
| 2012/0170548 A1 | 7/2012 | Rajagopalan et al. |
| 2012/0188949 A1 | 7/2012 | Salkintzis et al. |
| 2012/0224536 A1 | 9/2012 | Hahn et al. |
| 2012/0230191 A1 | 9/2012 | Fang |
| 2013/0100821 A1 | 4/2013 | Joshi |
| 2013/0163424 A1 | 6/2013 | Goerke et al. |
| 2013/0163434 A1 | 6/2013 | Hamel et al. |
| 2013/0258963 A1 | 10/2013 | Mihaly et al. |

FOREIGN PATENT DOCUMENTS

| | | |
|---|---|---|
| EP | 1619917 | 11/2006 |
| EP | 1978685 A1 | 10/2008 |
| GB | 2410865 | 8/2005 |
| WO | WO2004010668 | 11/2004 |
| WO | WO2009089455 | 7/2009 |

OTHER PUBLICATIONS

3GPP TR 25.820 v8.0.0 (Mar. 2008), 3rd Generation Partnership Project; Technical Specification Group Radio Access Networks; 3G Home NodeB Study Item Technical Report (Release 8); http://www.3gpp.org, 2008. 37 pages.

3GPP TS 22.011 v8.4.0 (Jun. 2008), 3rd Generation Partnership Project; Technical Specification Group Services and System Aspects; Service accessibility (Release 8), Global System for Mobile Communications, http://www/3gpp.org, 2008. 25 pages.

3GPP TS 22.220 v0.3.0 (Jul. 2008), 3rd Generation Partnership Project; Technical Specification Group Services and System Aspects;

(56) References Cited

OTHER PUBLICATIONS

Service requirements for Home NodeBs and Home eNodeBs; (Release 9), http://www.3gpp.org, 2008. 13 pages.
3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, http://www.3gpp.org, 2008. 259 pages.
3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www.3gpp.org, 2008. 240 pages.
3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008. 85 pages.
3GPP TS 23.236 v. 10 Technical Specification. "3rd Generation Partnership Project; Technical Specification Group Services and Systems Aspects; Intra-Domain Connection of Radio Access Network (RAN) Nodes to Multiple Core Network (CN) Nodes (Release 10)." Mar. 2010.39 pages.
3GPP TS 29.234 v7.9.0 (Jun. 2008), 3rd Generation Partnership Project; Technical Specification Group Core Network and Terminals; 3GPP system to Wireless Local Area Network (WLAN) interworking; Stage 3 (Release 7); http://www.3gpp.org, 2008. 92 pages.
3GPP TS 23.153 v7.2.0 (Mar. 2007), 3rd Generation Partnership Project; Technical Specification Group Core Network and Terminals; Out of band transcoder control; Stage 2 (Release 7); Global System for Mobile Communications, http://www.3gpp.org, 2007. 77 pages.
3GPP TS 24.234 v7.5.0 (Mar. 2007), 3rd Generation Partnership Project; Technical Specification Group Core Network and Terminals; 3GPP System to Wireless Local Area Network (WLAN) interwork-ing; WLAN User Equipment (WLAN UE) to network protocols; Stage 3 (Release 7), Global System for Mobile Communications, http://www.3gpp.org, 2007. 32 pages.
3GPP TS 25.410 v7.0.0 (Mar. 2006), 3rd Generation Partnership Project; Technical Specification Group Radio Access Network; UTRAN lu Interface: general aspects and principles (Release 7), http://www.3gpp.org, 2006. 28 pages.
3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008; 237 pages.
3GPP TS 33.234 v8.1.0 (Mar. 2008), 3rd Generation Partnership Project; Technical Specification Group Service and System Aspects; 3G Security; Wireless Local Area Network (WLAN) interworking security (Release 8), http://www.3gpp.org, 2008. 101 pages.
3GPP TS 43.318 v8.1.0 (Feb. 2008), 3rd Generation Partnership Project; Technical Specification Group GSM/EDGE Radio Access Network; Generic Access Network (GAN); Stage 2 (Release 8); Global System for Mobile Communications, http://www.3gpp.org, 2008. 122 pages.
3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications, http://www.3gpp.org, 2007. 19 pages.
3GPP TR. 23.829 v. 10.0.1 Technical Specification. "3rd Generation Partnership Project; Technical Specification Group Services and System Aspects; Local IP Access and Selected IP Traffic Offload (LIPA-SIPTO) (Release 10)." Oct. 2011,43 pages.
3GPP TS 23.041 v7.0.0 (Mar. 2006), 3rd Generation Partnership Project; Technical Specification Group Terminals; Technical realization of Cell Broadcast Service (CBS) (Release 7), Global System for Mobile Communications, http://www.3gpp.org, 2006.36 pages.

3GPP TS 23.107 v7.1.0 (Sep. 2007), 3rd Generation Partnership Project; Technical Specification Group Services and System Aspects; Quality of Service (QoS) concept and architecture (Release 7), http://1 www.3gpp.org, 2007. 40 pages.
3GPP TS 23.236 v7.0.0 (Dec. 2006), 3rd Generation Partnership Project; Technical Specification Group Services and System Aspects; Intra-domain connection of Radio Access Network (RAN) nodes to multiple Core Network (CN) nodes (Release 7); Global System for Mobile Communications, http://www.3gpp.org, 2006.37 pages.
3GPP TS 23.251 v7.0.0 (Jun. 2007), 3rd Generation Partnership Project; Technical Specification Group Services and System Aspects; Network Sharing; Architecture and functional description (Release 7), Global System for Mobile Communications, http://www.3gpp.org, 2007. 18 pages.
3GPP TS 23.271 vl0.2.0 (Mar. 2011), "3rd Generation Partnership Project; Technical Specification Group Services and Systems Aspects; Functional Stage 2 Description of Location Services (LCS) (Release 10)", 169 pages.
3GPP TS 23.401 v. 10.5.0 Technical Specification. "3rd Generation Partnership Project; Technical Specification Group Services and System Aspects: General Packet Radio Service (GPRS) enhancements for Evolved Universal Terrestrial Radio Access Network (E-UTRAN) access (Release 10)." Sep. 2011, 282 pages.
3GPP TS 23.402 vll.O.O (Sep. 2011), "3rd Generation Partnership Project; Technical Specification Group Services and System Aspects; Architecture Enhancements for Non-3GPP Accesses (Release 11)", 232 pages.
3GPP TS 24.302 vll.O.O (Sep. 2011), "3rd Generation Partnership Project; Technical Specification Group Core Network and Terminals; Access to the 3GPP Evolved Packet Core (EPC) via Non-3GPP Access Networks; Stage 3 (Release 11)", 58 pages.
3GPP TS 24.312 vll.O.O (Sep. 2011), "3rd Generation Partnership Project; Technical Specification Group Core Network and Terminals; Access Network Discovery and Selection Function (ANDSF) Management Object (MO) (Release 11)", 157 pages.
3GPP TS 25.412 v7.1.0 (Jun. 2006), 3rd Generation Partnership Project; Technical Specification Group Radio Access Network; UTRAN lu interface signaling transport (Release 7), http://www.3gpp.org, 2006. 11 pages.
3GPP TS 25.413 V7.8.0 (Dec. 2007), 3rd Generation Partnership Project; Technical Specification Group Radio Access Network; UTRAN lu interface RANAP signaling (Release 7), http://www.3gpp.org, 2007. 359 pages.
3GPP TS 25.414 v7.1.0 (Sep. 2006), 3rd Generation Partnership Project; Technical Specification Group Radio Access Network; UTRAN lu interface data transport and transport signaling (Release 7), http://www.3gpp.org, 2006.20 pages.
3GPP TS 25.415 v7.3.0 (Dec. 2006), 3rd Generation Partnership Project; Technical Specification Group Radio Access Network; UTRAN lu interface user plane protocols (Release 7), http://www.3gpp.org, 2006. 64 pages.
3GPP TS 25.419 v7.0.0 (Mar. 2006), 3rd Generation Partnership Project; Technical Specification Group RAN; UTRAN lu-BC Interface: Service Area Broadcast Protocol (SABP) (Release 7), http://1 www.3gpp.org, 2006. 77 pages.
3GPP TS 25.4ll v7.1.0 (Sep. 2007); 3rd Generation Partnership Project; Technical Specification Group Radio Access Network; UTRAL lu interface layer 1 (Release 7), http://www.3gpp.org, 2007, 9 pages.
3GPP TS 29.232 v8.3.0 (Jun. 2008), 3rd Generation Partnership Project; Technical Specification Group Core Network and Terminals; Media Gateway Controller (MGC)-Media Gateway (MGW) inter-face; Stage 3 (Release 8), http://www.3gpp.org, 2008. 145 pages.
3GPP TS 29.332 v8.2.0 (Jun. 2008), 3rd Generation Partnership Project; Technical Specification Group Core Network and Terminals; Media Gateway Control Function (MGCF)-IM Media Gateway; Mn Interface (Release 8), http://www.3gpp.org, 2008. 73 pages.
3GPP TS 29.414 v8.1.0 (May 2008), 3rd Generation Partnership Project; Technical Specification Group CoreNetwork and Termi-

(56) References Cited

OTHER PUBLICATIONS nals; Core network Nb data transport and transport signaling (Release 8), Global System for Mobile Communications, http://www.3gpp.org, 2008. 29 pages.
3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org, 2008. 14 pages.
3GPP TS 36.305 v10.3.0 (Sep. 2011), "3rd Generation Partnership Project; Technical Specification Group Radio Access Network; Evolved Universal Terrestrial Radio Access Network (E-UTRAN); Stage 2 Functional Specification of User Equipment (UE) Positioning in E-UTRAN (Release 10)", 51 pages.
3GPP TS 36.413 v10.3.0 (Sep. 2011), "3rd Generation Partnership Project; Technical Specification Group Radio Access Network; Evolved Universal Terrestrial Radio Access Network (E-UTRAN); SI Application Protocol (SIAP) (Release 10)", 255 pages.
3GPP TS 36.423 v10.3.0 (Sep. 2011), "3rd Generation Partnership Project; Technical Specification Group Radio Access Network; Evolved Universal Terrestrial Radio Access Network (E-UTRAN); X2 Application Protocol (X2AP) (Release 10)", 132 pages.
3GPP TS. 23.203 v. 11.3.0 Technical Specification. "3rd Generation Partnership Project; Technical Specification Group Services and Sys-tem Aspects; Policy and charging control architecture (Release 11)", Sep. 2011, 167 pages.
3GPP TSG SA WG2 Meeting #75, Proposed addition to TR 23.8xy V0.2.03rd Generation Partnership Project: Technical Specification Group Services and System Aspects: Local IP Access and Selected IP Traffic Offload; (Release 10). Kyoto, Japan, Aug. 31-Sep. 4, 2009, 5 pages.
Calhoun, et al., "CAPWAP Protocol Specification: draft-ietf-capwap-protocol-specification-15", Network Working Group, Internet-Draft, Oct. 31, 2008, 165 pages.
Cisco, "Cisco Location Service Solution: Enabling Mobility in Wired and Wireless Networks with Modular Cisco Catalyst Platforms", Jul. 2011, 5 pages.
Cisco, "LightweightAP (LAP) Registration to a Wireless LAN Con-troller (WLC)", Document ID: 70333, Updated Sep. 12, 2088, 13 pages.
PCT Mar. 6, 2012 International Search Report and Written Opinion for PCT/US2010/50427 dated Mar. 6, 2012. 9 pages.
PCT Nov. 19, 2010 International Search Report and Written Opinion issued for PCT/US2010/50418, dated Nov. 19, 2010 (14 pages).
Kundalkar et al., "LIPA: Local IP Access via Home Node B.", Continuous Computing, Nov. 13, 2009, 13 pages.

* cited by examiner

APPARATUS, SYSTEMS, AND METHODS FOR PROVIDING OFFLOADING TO AN ALTERNATE NETWORK

CROSS-REFERENCE TO RELATED APPLICATIONS

This application is a continuation application of U.S. patent application Ser. No. 12/853,125, entitled "Mobile Transport Solution for Offloading to an Alternate Network," filed Aug. 9, 2010, which claims benefit, under 35 U.S.C. § 119(e), of U.S. Provisional Patent Application No. 61/232,213, entitled "Cost Optimized Next Generation Mobile Transport Solution," filed Aug. 7, 2009; U.S. Provisional Patent Application No. 61/246,118, entitled "Providing an Offload Solution for a Communication Network", filed Sep. 26, 2009; and U.S. Provisional Patent Application No. 61/257,712, entitled "Providing Offloads in a Communication Network", filed Nov. 3, 2009, each of which is hereby incorporated by reference herein in its entirety.

TECHNICAL FIELD

This disclosure relates to a system and method for offloading selected data to an alternate communication network.

BACKGROUND

Wireless networks are telecommunications networks that use radio waves to carry information from one node in the network to one or more receiving nodes in the network. Wired communication can also be used in portions of a wireless network, such as in the core network. Cellular telephony is characterized by the use of radio cells that provide radio coverage for a geographic area, with multiple cells arranged to provide contiguous radio coverage over a larger area. Mobile devices use radio waves to communicate with the cellular radio cells, and the mobile devices can move from one cellular radio cell to another.

Mobile broadband networks are handling increasing amount of data traffic volume. This is in part because mobile devices are becoming more sophisticated and are able to engage in more data-intensive activities such as displaying movies or playing video games. The network segment between the radio base station and the network edge is often termed as the mobile backhaul. This segment is becoming a major bottleneck because of the lack of adequate bandwidth to support the deluge of data traffic in a cost effective manner. In many areas of the world, this segment is supported by microwave/UHF links and other point to point legacy links. Mass scale upgrade of these links to provide ample bandwidth for mobile broadband services is the most important task in hand for the operators. The capital expenses (CAPEX) and operational expenses (OPEX) for such upgrades of gigantic proportions are bound to slow down the availability of mobile broadband services to a large cross section of subscribers. So, operators are desperately looking for ways to offer mobile broadband services to their subscribers without having to incur an unreasonable amount of expenditure.

OVERVIEW

Certain embodiments disclose a method including receiving a packet at a gateway from a packet data network (PDN), inspecting the packet at an offload eligibility determination module by comparing rules based on policy at the gateway with information included in the packet, upon determining that the packet is offload eligible, modifying the packet at a processing module to prepare the packet for communication on an offload network, sending the modified packet onto the offload network for communication to a user equipment, and sending a non-offload eligible packet over a backhaul network to a radio access network.

DESCRIPTION OF EXAMPLE EMBODIMENTS

Figure 1:
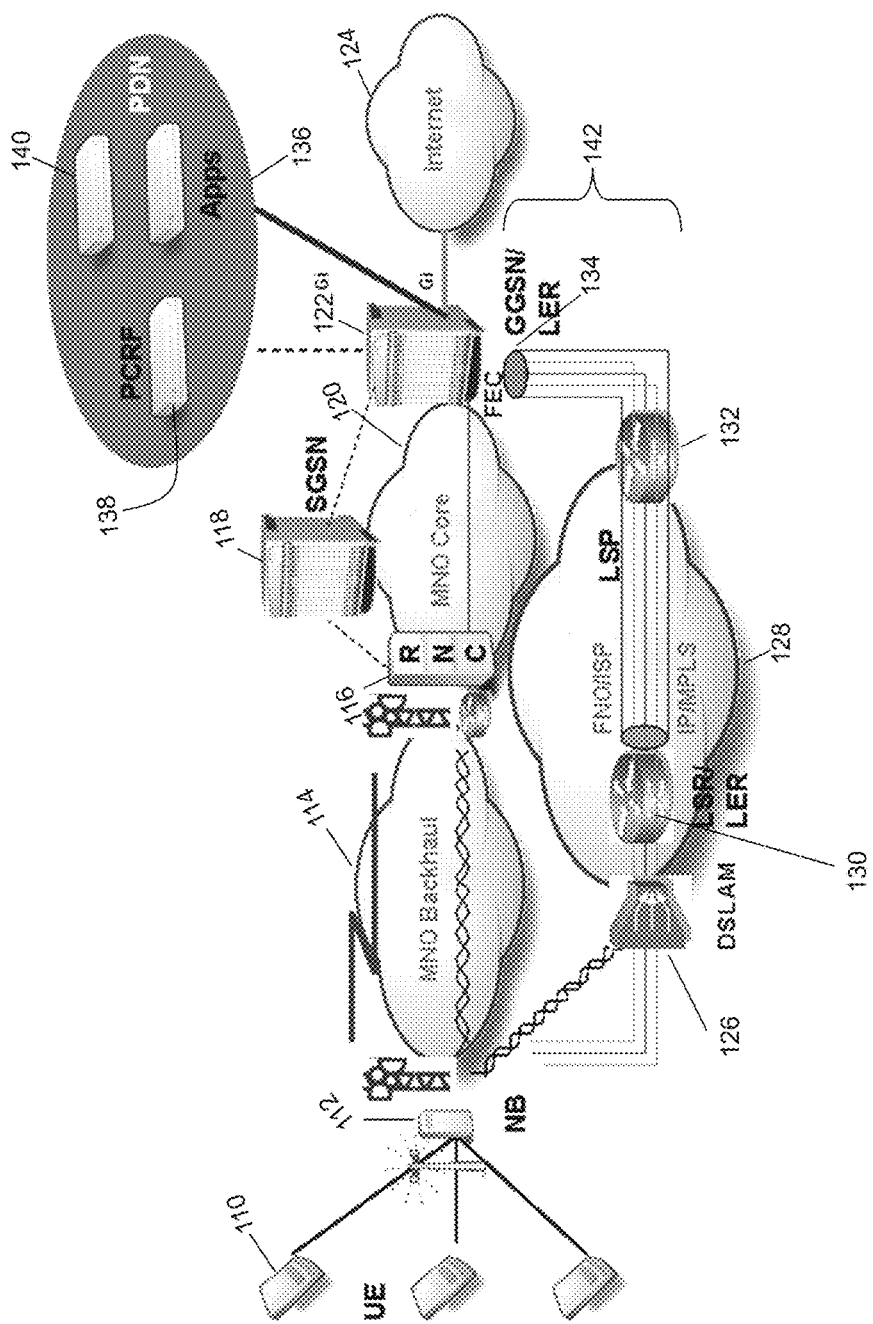
FIG. 1 illustrates a 3G communication network with a traffic offload and transport solution in accordance with certain embodiments.

The exponential growth of mobile broadband data is straining operators existing packet core elements, increasing mobile Internet delivery cost, and challenging the flat-rate data service models. The majority of this traffic is either Internet bound or sourced from the Internet, but is currently flowing through the operator's packet core and using traditional 3G deployment models. This is straining the operator's networks because the networks were designed primarily for voice calls and providing certain levels of service for these voice calls. However, the demand for bandwidth on operator's networks is not expected to slow in its growth. As mobile devices grow increasingly more sophisticated and the networks deliver increasingly more data to the mobile devices, the demand will continue to grow exponentially. The result is operators are paying more in capital and operating expenditures, while not seeing increased revenue due to this exponential growth in traffic. One solution to this problem is offloading the data from the operator's network onto the Internet. This disclosure describes systems and methods for offloading data from an operator's communication network.

This offloading can occur at various segments in the communication network and a variety of different mechanisms can be used. The goal of offloading is to move data in the most efficient way possible while not sacrificing service, features, or security. Generally, the operator's network is composed of a radio base station, a core network, and a network segment to connect the radio base station with the core network. This network segment between the radio base station and the network edge is often termed the backhaul network. This segment is becoming a bottleneck because it lacks adequate bandwidth to support the deluge of data traffic in a cost effective manner. In many areas of the world, this segment is supported by microwave/UHF links and other point to point legacy links, which were designed for the loads of voice calls. However, as the proportion of non-voice call traffic rises, these links are no longer capable of supporting the traffic. Keeping up with the growth in data traffic is an extremely important task for the operators. The capital expenses (CAPEX) and operational expenses (OPEX) for such upgrades are bound to slow down the availability of mobile broadband services to a large cross section of subscribers, and many subscribers grow frustrated with spotty service. As such, operators are looking for ways to offer mobile broadband services to their subscribers without having to incur an unreasonable amount of expenditure.

One of the focus areas for optimization is localization or offloading of some portion of data traffic to cost effectively sustain the backhaul load. At a high level, the goal of offloading is to place data on the most cost efficient route possible. A mobile network operator's network is more expensive to provision and operate per megabyte of data than an Internet connection per megabyte. This is because the mobile network is a specialized network that is optimized to provide mobile voice call service, which demands certain latency, audibility, roaming, and other characteristics that are not offered on a standard Internet connection. However, not all data sent on the mobile network needs to pass through the mobile operator's network in order to service the mobile subscriber. In implementing offloading, it is desirable to place the Internet peering points as close as possible to the radio base stations so the data traffic is offloaded to the Internet directly to/from the base stations. The radio base station can be co-located with an offloading function that detects and off-loads data traffic to an alternative route instead of a Mobile Network Operator's (MNO) backhaul links. The offloading function is configurable and the characteristics of the traffic eligible for offload can be specified in the offload function. One example includes offloading packets or traffic that is not of interest to the operator. Normally, this traffic volume falls under the best effort category. The offloaded traffic can be directed back into the mobile network operator's core for packet processing and further routing its final destination.

FIG. 1 illustrates a 3G communication network with a traffic offload and transport solution in accordance with certain embodiments. This communication network includes user equipment (UE) 110, node B (NB) 112, mobile network operator (MNO) backhaul 114, radio network controller (RNC) 116, serving GPRS support node (SGSN) 118, MNO core network 120, a gateway 122 implementing a gateway GPRS support node (GGSN)/label edge router (LER), PDN/Internet 124, digital subscriber line access multiplexer (DSLAM) 126, Internet Protocol/Multi-Protocol Label Switching (IP/MPLS) 128, label switch router/label edge router (LSR/LER) 130, label switched path (LSP) 132, forwarding equivalence class (FEC) 134, packet data network (PDN) 136, policy charging and rules function (PCRF) 138, and application server 140. Of these network devices, user equipment 110 is a mobile device that wirelessly communicates with the radio transmitter and can include a variety of wireless devices such as mobile phones, smart phones, laptops, mobile retransmitting antennas (e.g., MiFi), or netbooks.

The gateway 122 is responsible for the interworking between the core network 120 and external packet switched networks, like PDN/Internet 124 and PDN 136. GGSN of gateway 122 is the anchor point that enables the mobility of the UE 110, and provides a service similar to the Home Agent in Mobile IP. It also maintains routing necessary to tunnel the Protocol Data Units (PDUs) to the SGSN 118 that service a particular UE 110. GGSN of gateway 122 also performs authentication and charging functions. Other functions provided by GGSN of gateway 122 include subscriber screening, IP Pool management and address mapping, QoS and PDP context enforcement. SGSN 118 is responsible for the delivery of data packets from and to the mobile stations within its geographical service area. Its tasks include packet routing and transfer, mobility management (attach/detach and location management), logical link management, and authentication and charging functions. The location register of the SGSN 118 stores location information (e.g., current cell, current VLR) and user profiles (e.g., IMSI, addresses used in the packet data network) of users registered with this SGSN.

In FIG. 1, offloading is provided through IP/MPLS route 142. IP/MPLS provides a mechanism to create a virtual link or communication path been network devices and can encapsulate a variety of network protocols. In IP/MPLS network 142, data packets are assigned labels and packet-forwarding decisions are made based on this label. By assigning labels, IP/MPLS creates end-to-end virtual links across a variety of transport mediums. This IP/MPLS link can then be used to implement offloading by creating a lower cost network. In the traditional mobile broadband wireless core, the uplink and downlink traffic for each subscriber is mapped to certain bearer tunnels, such as Iu-Gn or S1-S5. For example, an IP packet arriving at gateway 122 in gets mapped to a Gn/Iu (GTP) tunnel towards the SGSN 118, RNC 116, or NB 112. The gateway 122 maps the IP packet based on its header fields, which are matched against packet filter(s) in gateway 122. The NB 112 puts the packets over pre-configured radio bearers towards the UE 110. On the uplink, the same operation takes place in the reverse direction. The gateway 122 checks the uplink packets for enforcement of uplink packet mapping rules. On the Gi side, the gateway 122 steers the packets towards packet data networks (e.g., PDN 136 or PDN/Internet 124) for rendering various services. The services rendered by the packet data networks include Firewall, Content Filtering, Application Servers 140 (e.g. video streaming), VPN and Enterprise specific applications, and Web Caching. If the PDN is Internet 124, the gateway 122 directs the traffic straight to the Internet 124.

Figure 2:
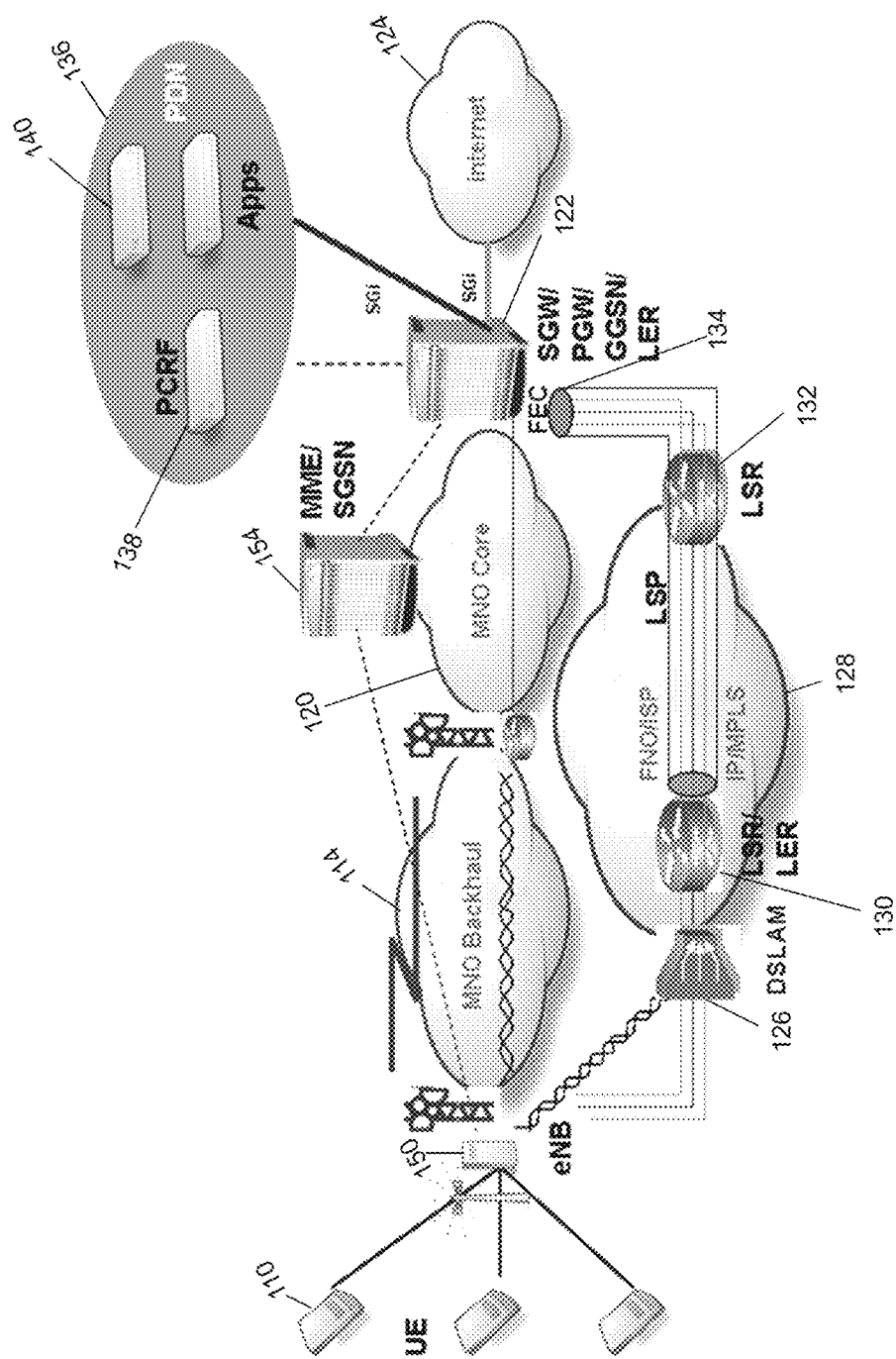
FIG. 2 illustrates offloading and transportation of data traffic in an LTE communication network in accordance with certain embodiments.

The offloading can similarly be provided in a 4G/Long Term Evolution (LTE) access network. FIG. 2 illustrates offloading and transportation of data traffic in a 4 G communication network in accordance with certain embodiments. This LTE communication network includes user equipment (UE) 110, evolved node B (eNB) 150, mobile network operator (MNO) backhaul 114, MNO core network 120, PDN/Internet 124, digital subscriber line access multiplexer (DSLAM) 126, Internet Protocol/Multi-Protocol Label Switching (IP/MPLS) 128, label switch router/label edge router (LSR/LER) 130, label switched path (LSP) 132, forwarding equivalence class (FEC) 134, packet data network (PDN) 136, policy charging and rules function (PCRF) 138, application server 140, gateway 122 implementing serving gateway (SGW)/pdn gateway (PGW)/GGSN/LER functionalities, and a gateway 154 implements mobility management entity (MME)/SGSN functionalities.

The MME/SGSN functionalities and SGW/PGW/GGSN/LER functionalities can be implemented in a gateway or network device as described below. In some embodiments, the SGW and PGW can be implemented on separate network devices. The main component of the LTE architecture is the Evolved Packet Core (EPC), also known as SAE Core. The EPC includes the MME, SGW and PGW components. The MME is a control-node for the LTE access network. The MME is responsible for UE 110 tracking and paging procedures including retransmissions. MME handles the bearer activation/deactivation process and is also responsible for choosing the SGW for a UE 110 at the initial attach and at time of an intra-LTE handover. The MME also authenticates the user by interacting with an authentication server. The MME also generates and allocates temporary identities to UEs and terminates Non-Access Stratum (NAS) signaling. The MME checks the authorization of the UE 110 to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks.

The SGW functionality of gateway 122 routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW functionality terminates the down link data path and triggers paging when down link data arrives for the UE 110. The SGW functionality manages and stores UE contexts, e.g. parameters of the IP bearer service and network internal routing information. The SGW functionality also performs replication of the user traffic in case of lawful interception. The PGW functionality of gateway 122 provides connectivity to the UE 110 to external packet data networks by being the point of exit and entry of traffic for the UE 110. A UE 110 may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 (CDMA 1X and EvDO).

In some embodiments offloading is provided between the radio access network (e.g., NB 112/eNB 150) and the gateways 122 (e.g., GGSN/PGW functionalities) because these devices provide a number of important functions. These functions include packet scheduling, bearer mapping, policy enforcement, admission control, encryption/decryption of the bearer plane. In contrast, the other nodes on the bearer plane are generally providing relays and redundant hops for data transmission. There are a number of reasons for offloading between the radio access network (RAN) and gateways. For example, when the offload eligible traffic is offloaded at the conventional ingress and egress points like NB 112/eNB 150 and GGSN/PGW on gateways 122, this eliminates the need to introduce costly hardware and software updates at large number of locations in the network. These upgrades would otherwise be needed to introduce GGSN like functions on other routers/devices in the network that are not configured to provide these types of functionality. It also eliminates the need to expand the number of Internet peering points, and the operator can easily modify and optimize offloading policy. This offload solution also provides for monetization and rendering value added services to the traffic, preventing the MNO from simply being a bit-pipe.

Other benefits of this offload embodiment include seamless mobility, security, policy enforcement, and traffic steering. This type of offloading leaves seamless mobility management capabilities intact, since the gateway is utilized. This includes providing inter-technology seamless mobility management so no feature sacrifice is necessary. This flexibility arises from the preserving the function and placement of the GGSN functionality/Gi interface and PGW functionality/SGi interface in the MNO core 120. In addition, subscriber data and session specific security keying material remain in safe hands because the GGSN/PGW on gateway 122 hosts this information. There is also an ease of policy enforcement and charging record collection due to potentially fewer PCEFs in the network, which reduce the costs to maintain the associated billing infrastructure. Finally, traffic steering reduces the need to distribute data center and PDN service centers. The GGSN/PGW of gateway 122 can steer data traffic via next hop routing (VLAN, MPLS, VPN etc.) on the Gi/SGi side to selectively apply PDN service policies for egress packets. This also reduces the burden of passing all traffic via the PDN processors/servers.

The offloading shown in FIGS. 1-2 can be implemented as follows. In the downlink, the ingress packets at the gateway 122 (e.g., providing one or more of GGSN/PGW/SGW/LER functionalities) are matched against pre-provisioned traffic filters and/or rules. These rules can be either statically provisioned or can be dynamically provisioned via an interface on gateway 122 (e.g., the Gx interface). Upon detection of an "Offload Eligible" packet flow, gateway 122 maps the flow to a bearer (e.g., Iu or S1) and passes it to the Label Edge Router (LER) function for Forwarding Equivalence Class (FEC) processing. Based on the FEC 134, the LER puts the packet over the Label Switched Path (LSP) established for the NB 112/eNB 150 using the Label Forwarding Information Base (LIFB). The LSPs are per NB 112/eNB 150—gateway 122 (e.g., GGSN/PGW) pair and are established over the FNO or ISP's network cloud 128. The LSPs are established and the FECs are updated based on any MPLS label distribution and LSP setup protocol. From the egress LER in the FNO/ISP's IP/MPLS network 128, the packets can be transported to the NB 112/eNB 150 via any transport mechanism. DSLAM 26 is shown for this last segment of connectivity, but other technologies such a fiber optic cable, microwave, or satellite may also be used to provide this connectivity.

In some embodiments, the LSPs are provisioned for each RAN—gateway pair (e.g., each eNB 112/NB 150—GGSN/PGW). Any LSP setup mechanism can be used for these LSPs. On the downlink, the gateway determines the destination address for the bearers (e.g., Iu/S1) and the FEC in the LER function selects the LSP accordingly. On the uplink, the traffic offload eligibility criteria can be locally provisioned in the NB 112/eNB 150. One such example policy is to offload all traffic traversing over default bearer. A more dynamic approach is to set an "offload eligibility flag" in the S1 and Iu bearer setup procedures. The gateway can set this flag in the control messages (e.g., Gn-C, S5-C) at the time of bearer establishment or anytime during the lifetime of the PDN connection or PDP context. The same can be conveyed by SGSN 118/MME 154 to the NB 112/eNB 150 via Iu-C and S1-MME signaling procedures, respectively.

Figure 3:
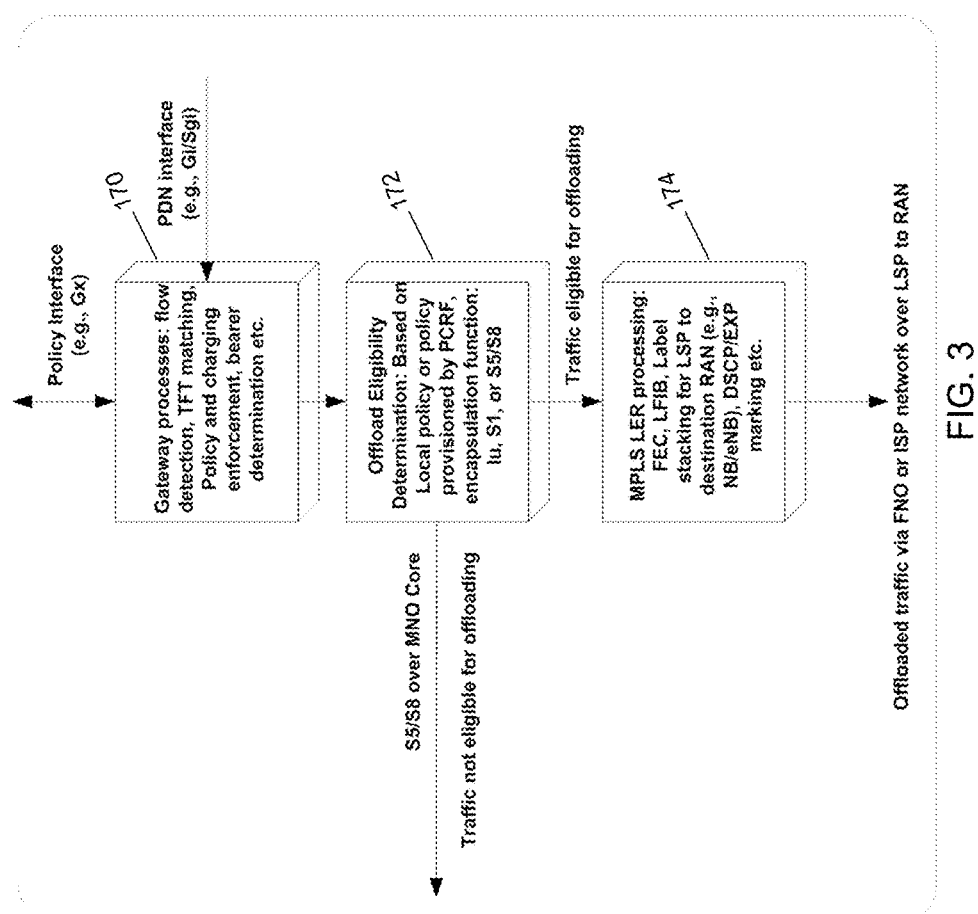
FIG. 3 illustrates a process for offload processing at a core network device in accordance with certain embodiments.

FIG. 3 illustrates downlink packet processing steps at the gateway 122. In 170, the gateway can interface with a charging rules function (CRF) to obtain rules and other information to implement processes such as flow detection, TFT matching, policy and charging enforcement, and bearer determination. These processes are then used to analyze packets on an interface (e.g., Gi/SGi) to the PDN/Internet 124 or PDN 136. In 172, an offload eligibility determination is made. This determination is based on local policy or policy provisioned by a PCRF 138. An offload eligibility module that is setup on gateway 122 determines whether the traffic is eligible for offloading. If it is ineligible for offloading, the packets are sent on an interface (e.g., S5/S8) over MNO core 120. If the traffic is eligible for offloading, in 174, the LER function processing occurs. This processing prepares the packets for offloading and involves forwarding equivalence class (FEC) processing, checking a label forwarding information base (LFIB), label stacking for the label-switched path to the destination NB 112/eNB 150, and marking using diffserv code point (DSCP) EXP bits in the MPLS header.

The gateway 122 also performs uplink processing on offload packets received from UE 110. The gateway 122 receives the uplink packets via the LSP 132 from the FNO/ISP's MPLS network 128. The uplink processing includes striping the MPLS labels from packets and encapsulating the packet payload (e.g., Iu/S1 payload) for sending to PDN 136 or Internet 124. After uplink packet processing, the gateway 122 determines whether the packet is sent to the Internet without further processing or the packet is routed via a specific service domain before it reaches its destination. This can be implemented by applying a traffic steering mechanism at the gateway 122 with steering policies either locally configured or dynamically provisioned (e.g., by a Gx interface) per subscriber. The service domain can include service content filtering, firewall, enhanced charging services, multi-host support, and enterprise specific services. Upon determining that a packet needs to go via a specific service domain, the gateway 122 applies appropriate next hop routing method (VLAN, GRE, MPLS, IPSec or other tunneling schemes). Otherwise, the next hop routing takes the packet directly to the Internet peering point. In some embodiments, there is no special requirement on the NB or eNB if MPLS LSP terminates at an egress LER, e.g. LER 130, somewhere in the FNO/ISP's network 128. Alternatively, the NB/eNB can include a co-located LER function to pop the LSP labels before processing the bearer packets.

Figure 4:
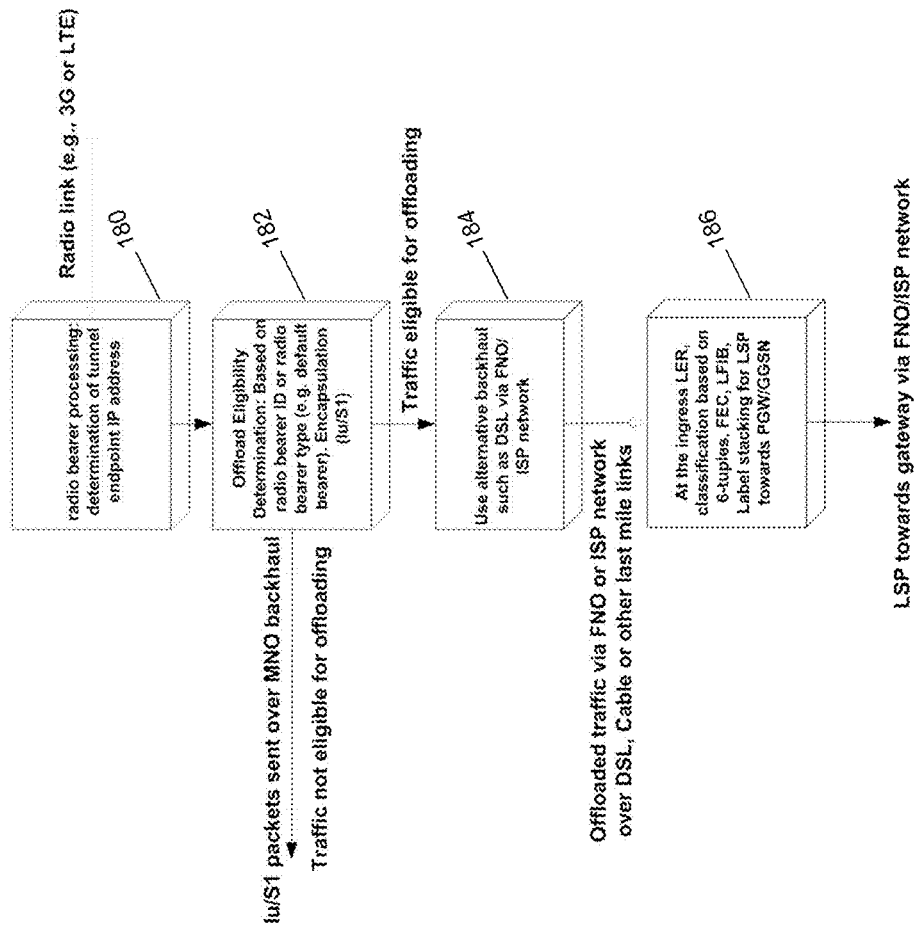
FIG. 4 illustrates a process for offload processing at a radio network device in accordance with certain embodiments.

FIG. 4 illustrates uplink packet processing steps at the radio access network (RAN) and LER in accordance with certain embodiments. The RAN can include NB 112/eNB 150 as well as other radio transmitters. In 180, radio bearer processing occurs at the RAN. This processing includes determining the Iu and S1 tunnel endpoint IP addresses. In 182, an offload eligibility determination is made. This determination can be based on a radio bearer ID or a radio bearer type. For example, Iu/S1 type packets can be a default bearer type that is not eligible for offloading and is sent over the MNO backhaul. These packets are encapsulated using the typical Iu/S1 procedures to send the packets over the mobile network. In 184, traffic that is eligible for offload is sent using an alternative backhaul such as a digital subscriber line or other last mile link in conjunction with a FNO/ISP network. In 186, at the ingress label edge router (LER) the packets are classified based on 6-tuples, FEC, and LFIB and label stacking for LSP is performed to send the data using MPLS towards the gateway.

Figure 5:
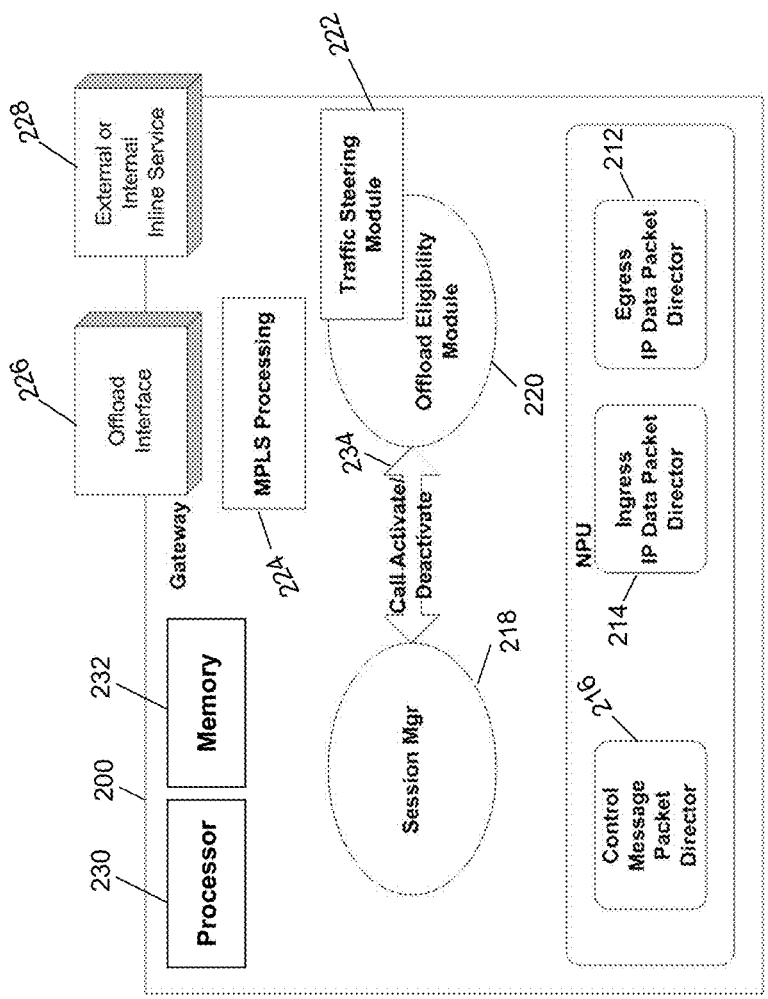
FIGS. 5-6 illustrate a logical view of a network device for offloading packets in accordance with certain embodiments.

FIG. 5 illustrates a logical view of a gateway that implements offloading in accordance with certain embodiments. The gateway 200 includes a network processing unit (NPU) 210, an egress IP data packet director 212, an ingress IP data packet director 214, a control message packet director 216, a session manager module 218, an offload eligibility module 220, a traffic steering module 222, a MPLS processing module 224, an offload interface 226, and an external/internal inline service 228, processor 230, memory 232, and communication module 234. The processor 230 and memory 232 are used to provide session manager 218, offload eligibility module 220, traffic steering module 222, and MPLS processing 224. For example, session manager 218 and processor 220 can include information stored in memory 232 upon which action is taken by processor 230. In some embodiments, offload eligibility module 220 can be implemented as a module that is a combination of hardware and software. Offload eligibility module 220 includes data stored in memory 232 such as rules for analyzing packets, state information that is used in analyzing packets and preserving decision, and configuration information. Multiple offload eligibility modules 220 can be used in gateway 200. The offload modules can communicate with NPU 210 to setup packet directors for specific flows or packet types. The packet directors setup in NPU 210 can be filers or other rules implemented in any combination of hardware or software. In some case, the packet directors use shallow packet inspection to quickly sort and direct packets.

Control message packet director 216 can be used by session manager 218 to monitor messaging that indicates a flow is being initiated, for example, monitoring real time streaming protocol (RTSP) requests to a media server. The packet directors in NPU 210 can monitor packets and direct packets (or information from the packets) to the proper module by checking packets for certain criteria and directing the packets based on the criteria. Typically, the packet directors in NPU 210 perform a limited inspection of the packet based on what is expected of packets in the flow or based on a certain category of packet. If the packet meets certain criteria, it is directed according to the proper module, which is typically an offload eligibility module 220.

In the example of a real-time streaming protocol video stream, the RTSP requests are received by the gateway 200 at an interface. Control massage packet director 216 recognizes it as an RTSP request and forwards it to session manager 218. Session manager 218 can setup an offload eligibility module 220 for this expected flow and can also setup a packet director in NPU 210 to direct packets to offload eligibility module 220 or to MPLS processing module 224 for further analysis, modification, or redirection. MPLS processing module 224 can implement a label edge router (LER) function through the processing performed by MPLS processing module 224. The MPLS processing module 224 can provide LER processing, forwarding equivalence class (FEC) processing, label forwarding information base (LFIB) processing, label stacking for the label switched path, DSCP/EXP marking, and other task to prepare the packet for offload. Session manager 218 analyzes messages to activate and deactivate sessions, and if needed offload eligibility modules 220, in gateway 200. During the inspection of the messages by session manager 218, information is also obtained that can be used to setup the session, authenticate the session, and link the session to a subscriber profile. When a new session is activated, session manager 218 can authenticate the call to load the subscriber profile. The authentication can involve the NAI, the MSID, the user name and password, or any other authentication attribute of the user equipment. The subscriber profile includes configuration information such as the subscriber access control list (ACL), the corresponding traffic steering module redirections, and other services applied for this subscriber. When the call is authenticated or authorized, then QoS can be setup on a per-session basis and the packet flow begins. The session manager may also authenticate the subscriber with a PCRF so the PCRF can send policy information and instructions regarding QoS and services to be provided to the subscriber's data. This information may impact whether traffic is offloaded. If the traffic is determined to be offloadable, then the packet flow is sent to MPLS processing 224, which sends it to offload interface 226.

Traffic steering module 222 defines how packet flows are handled by gateway 200 based on the characteristics of the packets, which includes information in a packet header. The traffic steering module 222 includes features such as load balancing, network address translation (NAT), HTTP redirection, and DNS redirection. In some embodiments, the traffic steering module 222 uses information obtained from the subscriber profile to both select appropriate content service providers (e.g., the in-line service or external content server) and route the packet flows in a load balanced fashion. The load balancing can be accomplished by a number of algorithms such as round robin, least loaded, destination hashing, and normalized response time monitoring. The traffic steering module 222 can also monitor the health of external servers through internet control message protocol (ICMP), hypertext transfer protocol (HTTP), transfer control protocol (TCP), and file transfer protocol (FTP) keepalive mechanisms. By monitoring the health of external servers, the traffic steering module 222 can redirect packet flows if an external server fails. The traffic steering module 222 can also implement transcoding by redirecting media stream to an DSP card for processing. The traffic steering module 222 can direct the media stream packet flow to an enhanced charging service (ECS) in conjunction with dynamic quality of service.

In providing offload of data, the offload eligibility module includes analyzing and determining what traffic is eligible for offloading. The offload eligibility module can use an analyzer to inspect and analyze packets received in a variety of protocols at the different layers of the open systems interconnection (OSI) stack. The offload eligibility module supports, inspects, and analyzes at least the following protocols: internet protocol (IP), internet message access protocol (IMAP), transmission control protocol (TCP), user datagram protocol (UDP), domain name system (DNS), file transfer protocol (FTP), trivial file transfer protocol (TFTP), simple mail transfer protocol (SMTP), post office protocol version 3 (POP3), hypertext transfer protocol (HTTP), internet control message protocol (ICMP), wireless access protocol (WAP), wireless transaction protocol (WTP), wireless session protocol (WSP), real-time protocol (RTP), real-time streaming protocol (RTSP), multimedia messaging service (MMS), session initiation protocol (SIP), session description protocol (SDP), and MSN Messenger.

The analyzer can be based on configured rules that may be static or dynamically provisioned. Rules used for traffic analysis analyze packet flows and form offload decisions. The analyzer performs shallow (Layer 3 and Layer 4) and deep (above Layer 4) packet inspection of the IP packet flows, depending on the packet and the rule for offloading. Shallow inspection includes examining, for example, the IP header (Layer 3) or UDP/TCP header (Layer 4), while deep packet inspection includes examining, for example, the Uniform Resource Identifier (URI) information (layer 7). The analyzer can also correlate layer 3 packets (and bytes) with higher layer trigger criteria (e.g. URL detected in a HTTP header) and also perform stateful packet inspection with complex protocols like FTP, RTSP, SIP that dynamically open ports for the data path. The shallow and deep packet inspection identify trigger conditions that are used in determining whether a packet or packet flow is eligible for offload.

In some cases, Layer 3 and 4 analyzers that identify a trigger condition are insufficient for offloading determination purposes, so layer 7 is used. For example, the web site www.companyname.com corresponds to IP address 1.1.1.1. Since all parts of this web site correspond to a destination address of 1.1.1.1 and port number 80 (http), the determination of offloadable user traffic may need to be through inspection of the actual URL (Layer 7). For example, a video about the company (www.companyname.com/video) is offloadable, but this information may not be available from shallow packet inspection to setup the offload. Deep packet inspection performs packet inspection beyond Layer 4 inspection and is typically deployed for detection of URI information at level 7 (e.g. HTTP, WTP, RTSP URLs) and the identification of true destination in the case of terminating proxies, where shallow packet inspection would only reveal the destination IP address/port number of a terminating proxy such as the operating company's WAP gateway. The gateway can also perform de-encapsulation of nested traffic encapsulation, e.g. MMS-over-WTP/WSP-over-UDP/IP, and verification that traffic actually conforms to the protocol the layer 4 port number suggests. The offload module has the ability to employ deep packet inspection if shallow packet inspection does not provide enough information on which to make an offload determination.

In providing inspection and offloading, rule definitions can be used to determine whether packets are eligible for offloading. Rule definitions (ruledefs) are user-defined expressions, based on protocol fields and/or protocol-states, which define what actions to take when specific field values are true. Expressions may contain a number of operator types (string, =, >, etc.) based on the data type of the operand. For example, "string" type expressions like URLs and hostname can be used with comparison operators like "contains", "!contains", "=", "!=", "starts-with", "ends-with", "!starts-with" and "!ends-with". Integer type expressions like "packet size" and "sequence number" can be used with comparison operators like "=", "!=", ">=", "<=". Each Ruledef configuration can include multiple expressions applicable to any of the fields or states supported by the respective analyzers. Each rule definition can be used across multiple rule bases and up to 1024 Ruledefs can be defined in some embodiments.

Rule definitions have an expression part, which matches particular packets based upon analyzer field variables. This is a boolean (analyzer_field operator value) expression that tests for analyzer field values. For example; http url contains cnn.com or http any-match=TRUE. The categories of ruledefs include routing ruledefs and offload ruledefs. The routing ruledefs are used to route packets to content analyzers. Routing ruledefs determine which content analyzer to route the packet to when the protocol fields and/or protocol-states in ruledef expression are true. Offload ruledefs are used to specify what action to take based on the analysis done by the content analyzers. Actions can include redirection, offloading, dropping, or normal forwarding, charge value, and billing record emission. Ruledefs are configurable through commands sent to the gateway. Ruledefs support a priority configuration to specify the order by which the ruledefs are examined and applied to packets.

Figure 6:
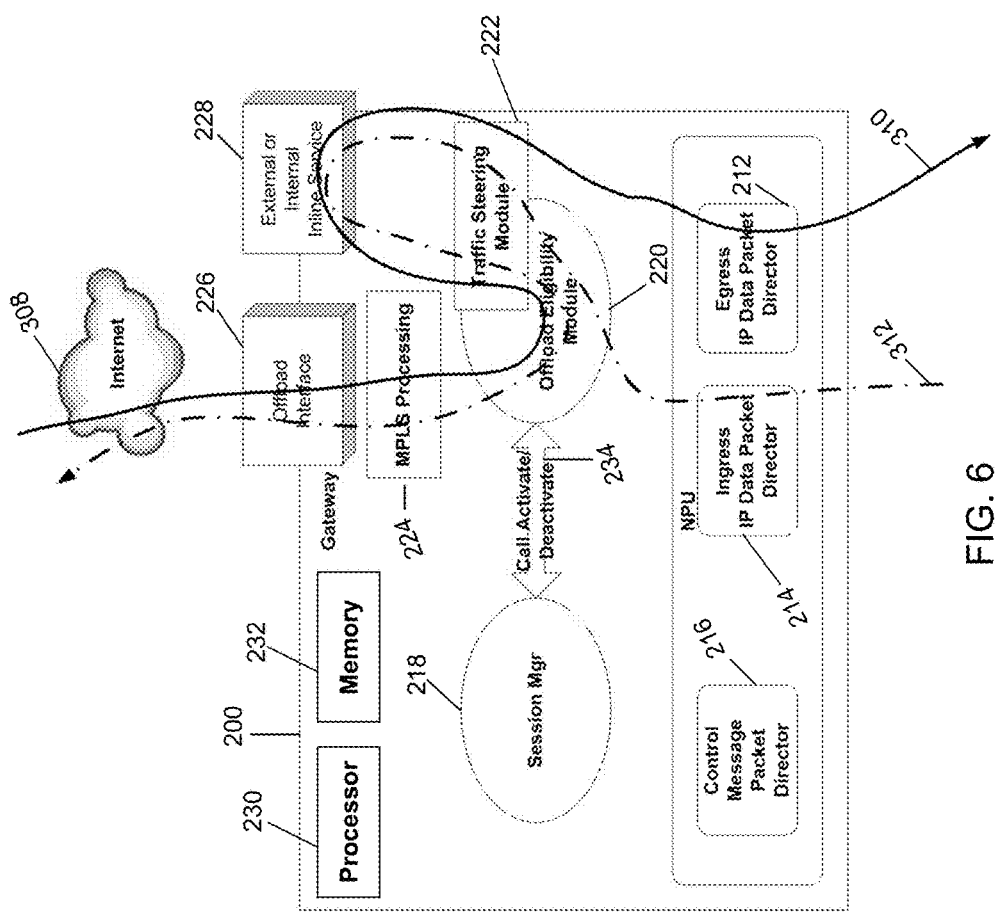

FIG. 6 illustrates offloading of packet flows in a gateway in accordance with certain embodiments. FIG. 6 includes an internet 308, which is used in offloading data, an uplink stream 310, and a downlink stream 312. The uplink stream 310 includes one or more packets that are offload eligible that are sent from the user equipment. This can include a VPN session on a laptop, the uploading of video content to a server from a smartphone or mobile computer, or the archiving of information to a server. The downlink stream 312 includes one or more packets that are offload eligible that are sent to the user equipment. This can include data such as video, audio, pictures, web content, online gaming content, or data files. The downlink stream 312 can be received on an interface of gateway 200 and be send to NPU 210, where an Ingress IP data packet director 214 identifies the packets and sends the packets to offload eligibility module 220, which identifies the packets in relation to subscriber information and can determine whether packets are offload eligible. Once decisions are made with respect to packets the flow can be streamlined avoiding further processing. With downlink stream 312, the stream is being provided at least one service so traffic steering module 222 is used to send the downlink stream 312 to an external or internal inline service 228 after which the downlink stream 312 is offloaded. The MPLS processing module 224 is used to prepare the packets for offloading. In this case, offloading to an MPLS network on Internet 308. The offload interface is used to send and receive packet from the Internet 308.

Figure 7:
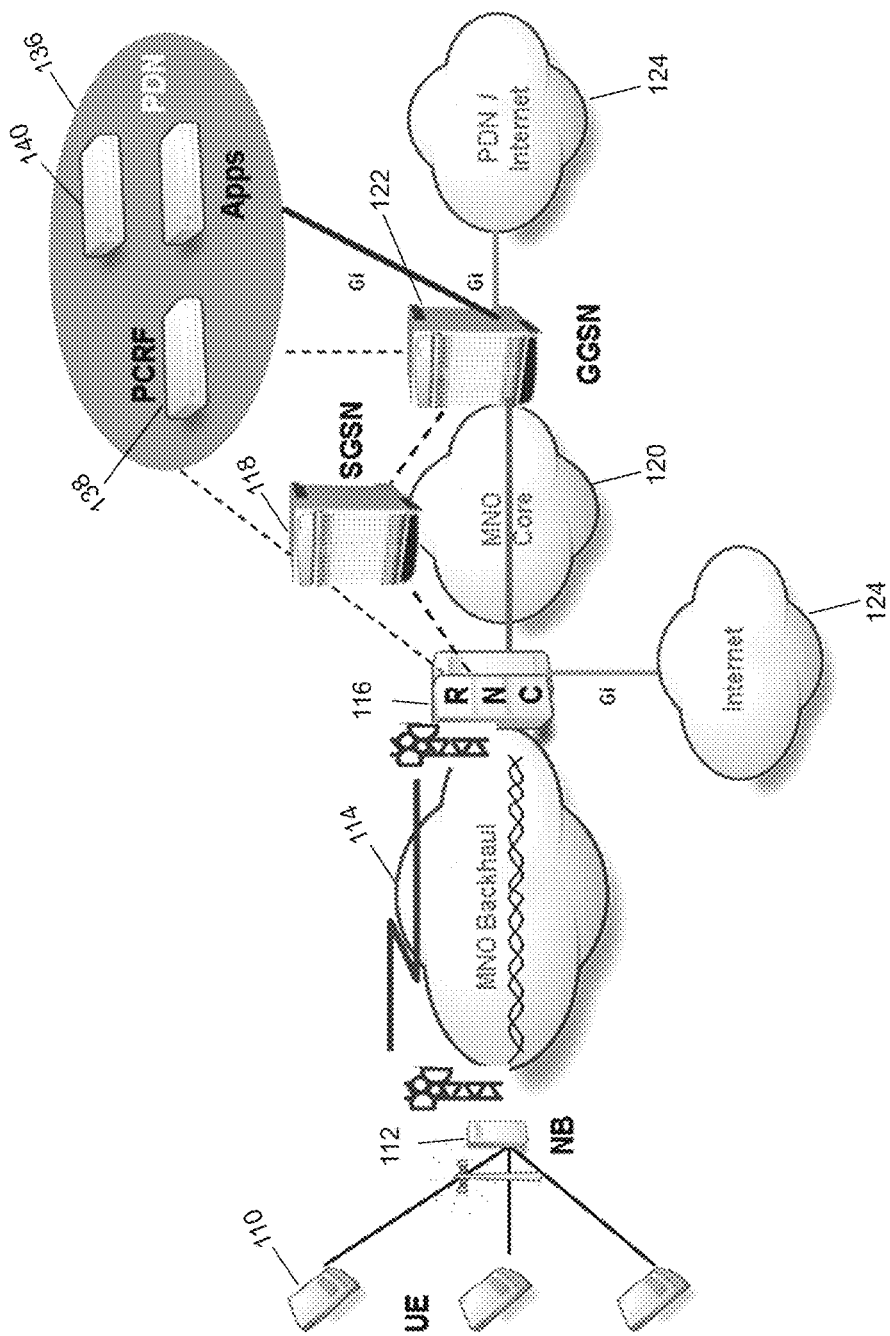
FIG. 7 illustrates offloading at the edge of the core network in accordance with certain embodiments.

Other embodiments are also possible to implement offloading in a wireless network. FIG. 7 illustrates offloading at the edge of the core network in accordance with certain embodiments. In this configuration, the Gi interface is co-located with the RNC 116 in a 3G (UMTS) network. This Gi interface is used to branch out traffic to the Internet 124 directly at the RNC site using a GGSN like function. The offload eligible traffic traverses over the MNO's backhaul 114 over a designated PDP context (Iu). In this configuration, in order for the operator to monetize and apply dynamic policy on the offloaded traffic, the distributed GGSN like function (co-located with the RNC 116) can include a Gx interface. This configuration allows by-passing some of the core network 120, but does not address the MNO backhaul 114, which is can continue to require expensive upgrades to handle increased data flow. Some network operators may desire an offload solution that can help relieve congestion on the MNO backhaul 114.

Figure 8:
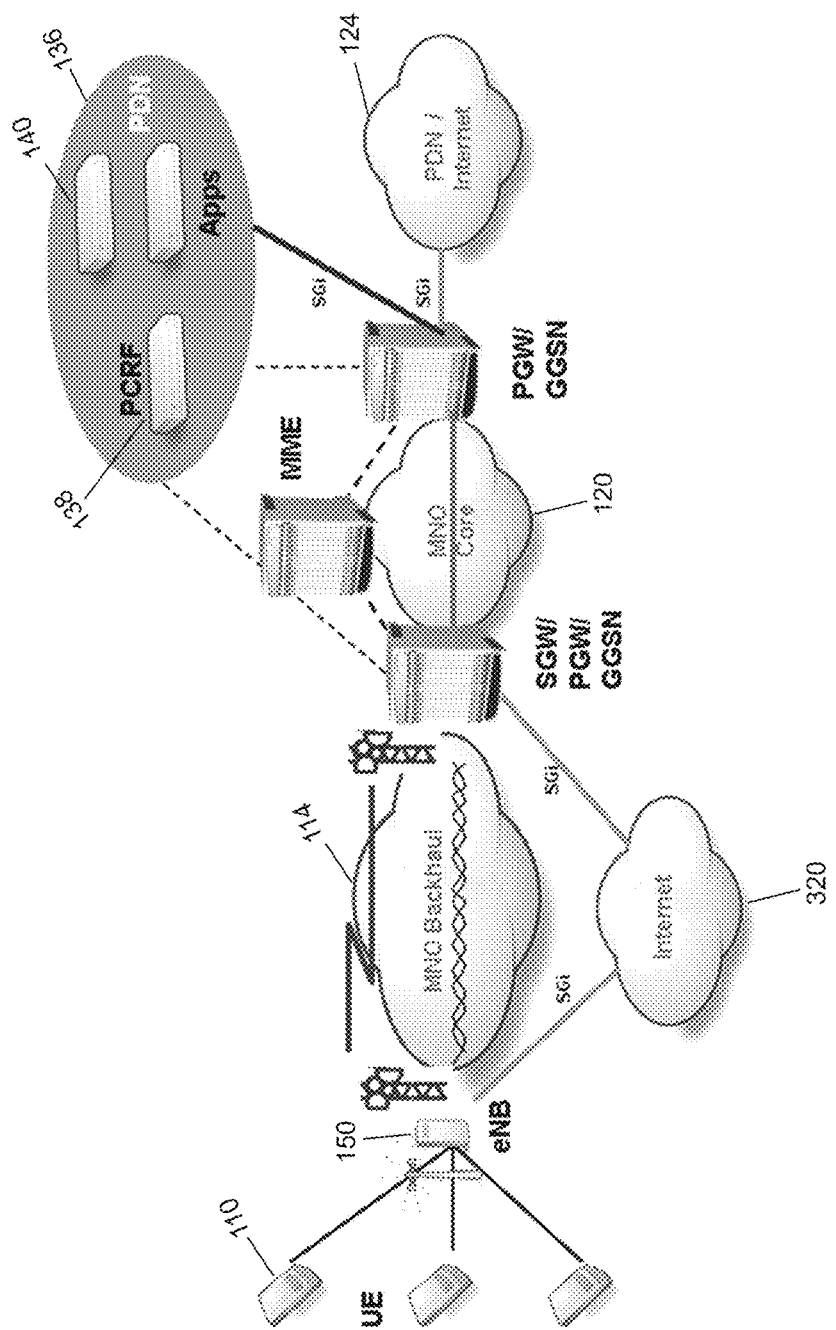
FIG. 8 illustrates an offload solution for bypassing the mobile network operator's backhaul in accordance with certain embodiments.
Figure 9:
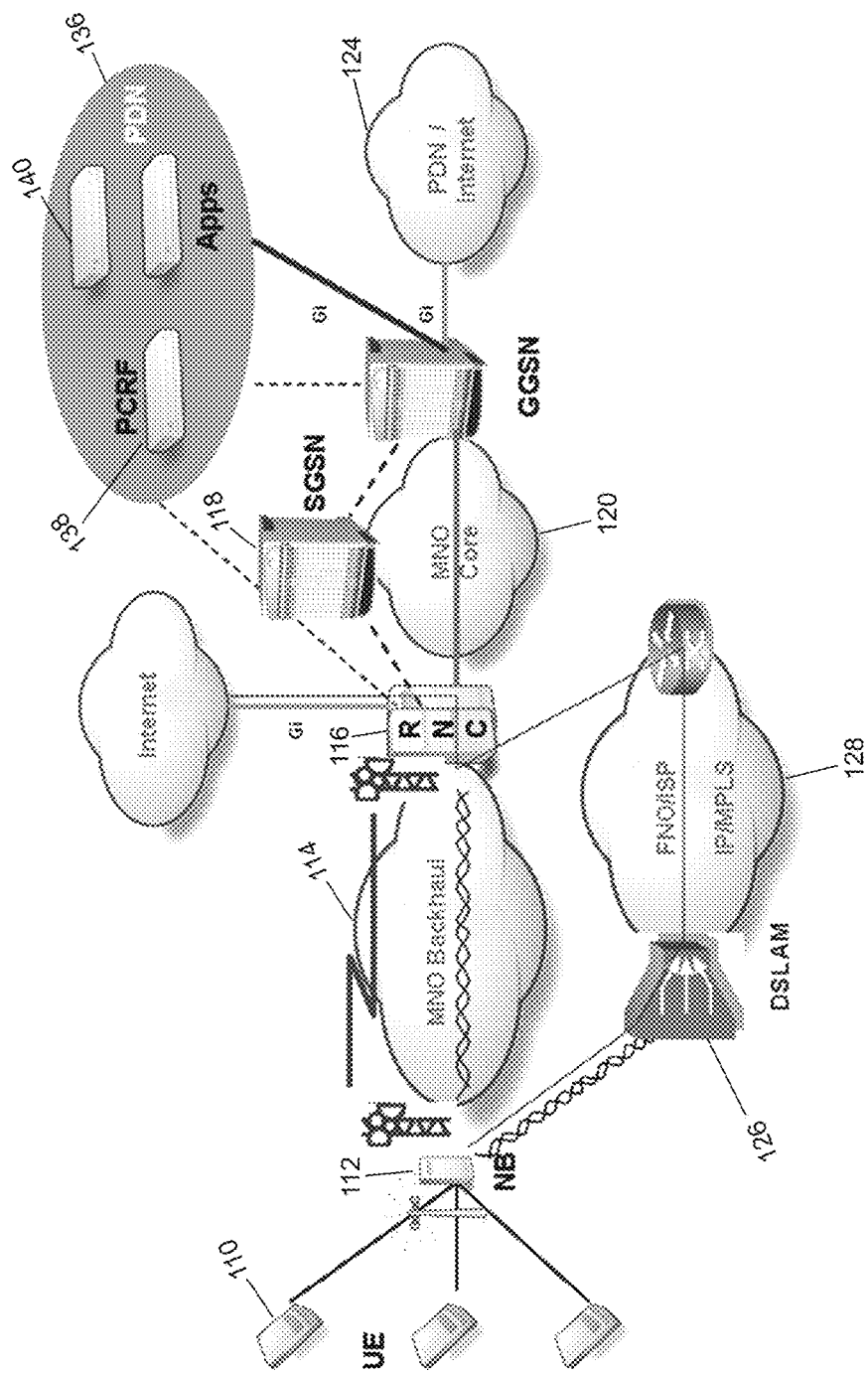
FIG. 9 illustrates an offload solution for bypassing the mobile network operator's backhaul network and the core network in accordance with certain embodiments.

FIG. 8 illustrates an embodiment where internet peering points are placed close to the radio access network providing an offload for the MNO backhaul. FIG. 8 includes use of an interface such as SGi to provide the offload, which can be implemented by provisioning internet peering points at every eNB 150 or RAN location. The internet peering points can be offload gateways or a network device that can apply a policy at the RAN location. The traffic is then offloaded on Internet 320 using a tunnel or other mapping. FIG. 9 illustrates an offload embodiment where an alternate wireless technology is used for the backhaul in conjunction with an IP/MPLS network 128 and the data is configured through a radio network controller 116. The RNC 116 can include a distributed gateway function providing a interface to the internet.

The co-located GGSN like function at this site egresses the uplink packets towards the destinations in the Internet. The downlink packets take the same route only in the reverse direction. This alternative embodiment addresses the backhaul problem and can offload without burdening the core network 120. In some embodiments, a combination of FIG. 9 and FIG. 2 can be implemented. In this scenario, some traffic that does not need any services can be offloaded without involving the core network (as shown in FIG. 9), while other traffic that uses core network services is offloaded to the core network (as shown in FIG. 2). In this embodiment, on the uplink, the NB detects offload eligible flows (e.g. default PDP context, radio bearer) and opts to transport these packets over DSL links. The DSL transport is over a Fixed Network Operator (FNO) or an Internet Service Provider (ISP) IP/MPLS network 128. The encapsulated packets eventually make their way back to the MNO's network at the RNC site.

Implementation of Gateway

The gateway described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a packet data serving node (PDSN), a foreign agent (FA), and/or home agent (HA). In certain embodiments, the functionalities are provided by a combination of hardware and software in the network device. General purpose hardware can be configured in the network device to provide one or more of these specialized functionalities.

Figure 10:
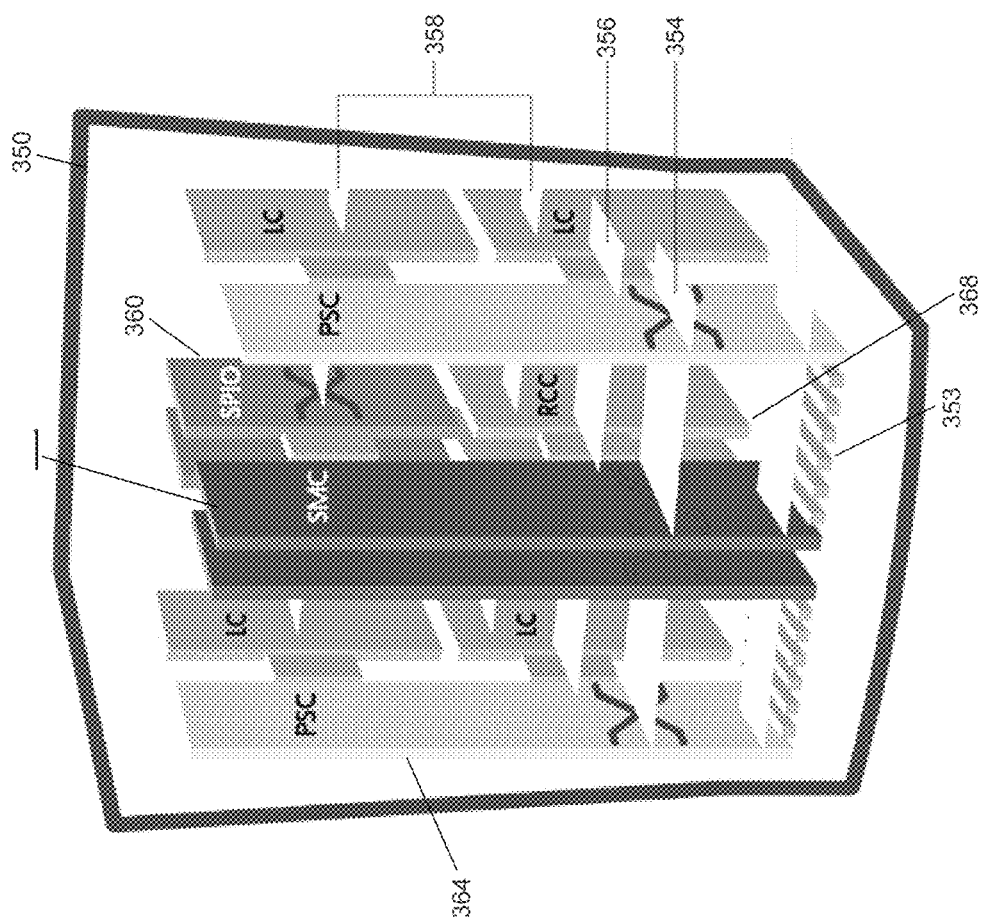
FIG. 10 illustrates a network device configuration in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 10 illustrates the implementation of a network device in accordance with some embodiments. The network device 350 includes slots 352 for loading application cards and line cards. A midplane can be used in the network device to provide intra-network device communications, power connections, and transport paths between the various installed cards. The midplane can include buses such as a switch fabric 354, a control bus 356, a system management bus, a redundancy bus 358, and a time division multiplex (TDM) bus. The switch fabric 354 is an IP-based transport path for user data throughout the network device implemented by establishing inter-card communications between application cards and line cards. The control bus 356 interconnects the control and management processors within the network device. The network device management bus provides management of system functions such as supplying power, monitoring temperatures, board status, data path errors, card resets, and other failover features. The redundancy bus 358 provides transportation of user data and redundancy links in the event of hardware failures. The TDM bus provides support for voice services on the system.

The network device supports at least four types of application cards: a switch processor I/O card (SPIO) 360, a system management card (SMC) 362, a packet service card (PSC) 364, and a packet accelerator card (not shown). Other cards used in the network device include line cards 366 and redundant crossbar cards (RCC) 368. The line cards 366, when loaded in the network device, provide input/output connectivity to the network and other devices, as well as redundancy connections. The line cards 366 include interfaces to the network through Ethernet, Fiber Optic, and the other communication mediums. The redundant crossbar card (RCC) 368 includes a non-blocking crossbar and connections to each of the cards in the network device. This allows a redundant connection to be made through the redundant crossbar card 368 from any one card to any other card in the network device. The SPIO card 360 serves as a controller of the network device and is responsible for such things as initializing the network device and loading software configurations onto other cards in the network device.

The system management card (SMC) 362 and switch processor card (not shown) are system control and management cards for managing and controlling other cards in the network device. The packet accelerator card (PAC) and packet service card (PSC) 364 provide packet processing, context processing capabilities, and forwarding capabilities among other things. The PAC and PSC 364 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

Figure 11:
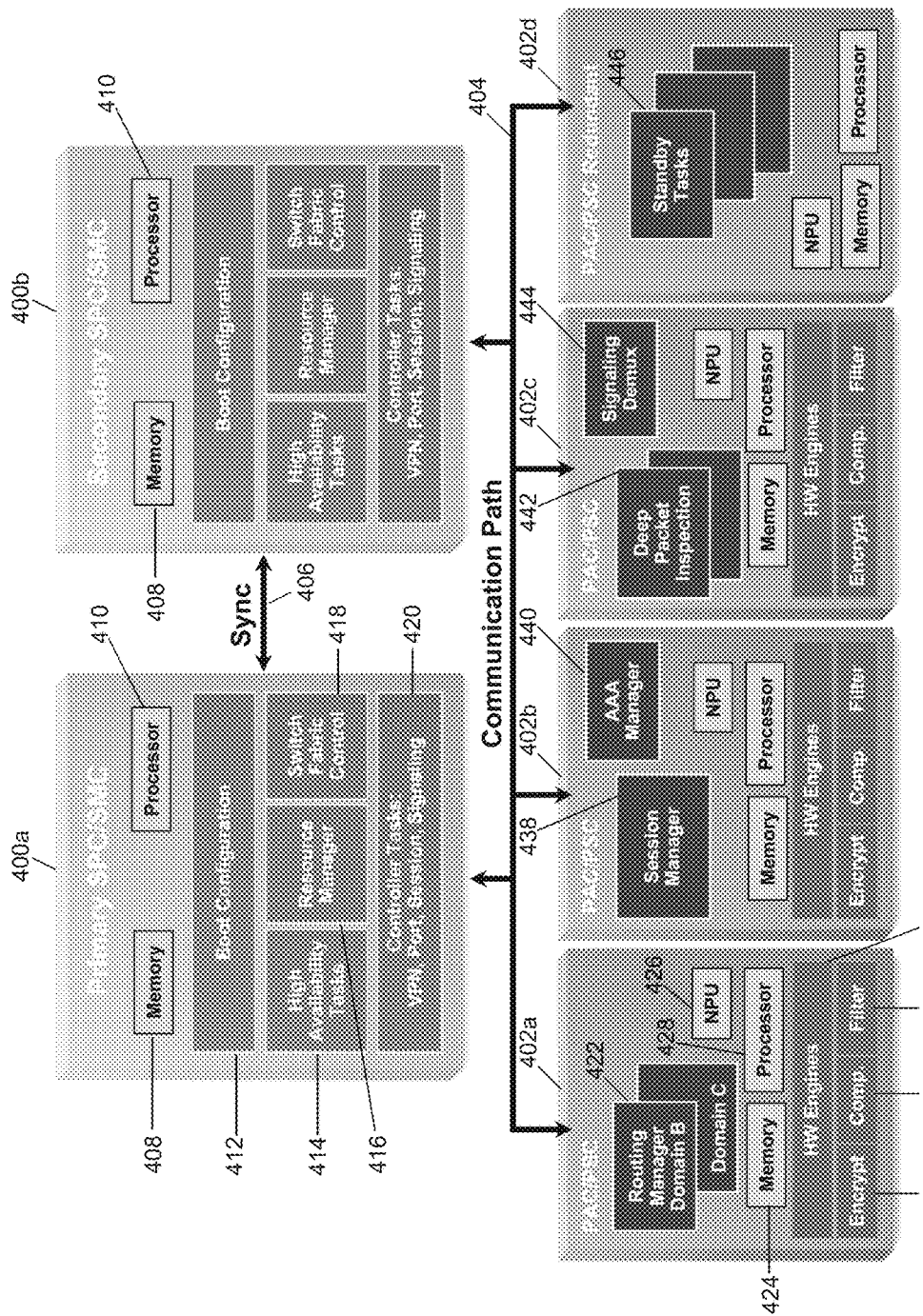
FIG. 11 illustrates an architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 11 illustrates a logical view of the software architecture of a network device in accordance with certain embodiments. As shown, the software and hardware can be distributed within the network device and across different circuit boards, processors, and memory. FIG. 11 includes a primary switch processor card (SPC)/system management card (SMC) 400a, a secondary SPC/SMC 400b, PAC/PSC 402a-402d, a communication path 404, and a synchronization path 406. The SPC/SMC 400 include a memory 408, a processor 410, a boot configuration 412, high availability tasks 414, resource manager 416, switch fabric control 418, and controller tasks 420.

The SPC/SMC 400 manage and control the network device including the other cards in the network device. The SPC/SMC 400 can be configured in a primary and secondary arrangement that provides redundancy and failsafe protection. The modules or tasks running on the SPC/SMC 400 are related to network device wide control and management. The boot configuration task 412 includes information for starting up and testing the network device. The network device can also be configured to startup in different configurations and providing different implementations. These can include which functionalities and services are capable of running on the SPC/SMC 400. The high availability task 414 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 400 or a PAC/PSC 402, while some processor intensive tasks can also be performed across multiple PACs/PSCs to utilize multiple CPU resources. Distribution of these tasks is invisible to the user. The switch fabric control 418 controls the communication paths in the network device. The controller tasks module 420 can manage the tasks among the resources of the networks to provide, for example, VPN services, assign ports, and create, delete, and modify sessions for user equipment.

The PAC/PSC 402 are high-speed processing cards that are designed for packet processing and the tasks involved with providing various network functionalities on the network device. The PAC/PSC 402 include a memory 424, a network processing unit (NPU) 426, a processor 428, a hardware engine 430, an encryption component 432, a compression component 434, and a filter component 436. Hardware engines 430 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 402 is capable of supporting multiple contexts. The PAC/PSC 402 are also capable of running a variety of tasks or modules. PAC/PSC 402a provides routing managers 422 with each covering routing of a different domain. PAC/PSC 402b provides a session manager 438 and an AAA manager 440. The session manager 438 manages one or more sessions that correspond to one or more user equipment. A session allows a user equipment to communicate with the network for voice calls and data. The AAA manager 440 manages accounting, authentication, and authorization with an AAA server in the network. PAC/PSC 402 provides a deep packet inspection task 442 and a signaling demux 444. The deep packet inspection task 442 provides inspection of packet information beyond layer 4 for use and analysis by the network device. The signaling demux 444 can provide scalability of services in combination with other modules. PAC/PSC 402d provides redundancy through standby tasks 446. Standby tasks 446 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow.

What is claimed is:

1. A computer-implemented method to provide offloading from a mobile backhaul network to an offload network, the computer-implemented method comprising:
    receiving, at a radio base station, a packet from a mobile device over a radio network;
    determining, at the radio base station and by operation of one or more computer processors, and based on at least one of a radio bearer type associated with the packet and a radio bearer identification associated with the packet, whether the packet is eligible to be sent to a gateway via the offload network instead of the mobile backhaul network, wherein the mobile backhaul network is operatively connected to the radio base station and the gateway; and upon a determination that the packet is eligible to be sent to the gateway via the offload network, providing, by the radio base station, the packet to a router that is configured to add routing information to the packet to cause the packet to be routed over the offload network to the gateway, thereby bypassing the mobile backhaul network, whereupon the gateway is configured to strip routing information associated with the packet received from the radio base station via the offload network and further configured to encapsulate a payload of the packet to cause the packet to be routed to the radio network;

wherein the radio base station is configured to, upon a determination that the packet is not eligible to be sent to the gateway via the offload network, cause the packet to be routed over the mobile backhaul network to the gateway.

2. The computer-implemented method of claim 1, wherein determining whether the packet is eligible to be sent to the gateway via the offload network includes determining the radio bearer identification associated with the packet.

3. The computer-implemented method of claim 1, wherein determining whether the packet is eligible to be sent to the gateway via the offload network includes determining the radio bearer type associated with the packet.

4. The computer-implemented method of claim 3, wherein when the radio bearer type is a default bearer type, determining that the packet is not eligible to be sent to the gateway via the offload network.

5. The computer-implemented method of claim 1, wherein the router includes a label edge router (LER) and the offload network includes a multiprotocol label switching (MPLS) virtual link between the gateway and the radio base station.

6. The computer-implemented method of claim 5, further comprising performing label stacking to send the packet to the gateway using MPLS.

7. A radio access network to provide offloading from a mobile backhaul network to an offload network, the radio access network comprising:
a radio base station configured to: (i) receive a packet from a mobile device over a radio network and (ii) determine, by operation of one or more computer processors and based on at least one of a radio bearer type associated with the packet and a radio bearer identification associated with the packet, whether the packet is eligible to be sent to a gateway via the offload network instead of the mobile backhaul network, wherein the mobile backhaul network is operatively connected to the radio base station and the gateway; and
a router configured to add routing information to the packet to cause the packet to be routed over the offload network to the gateway, thereby bypassing the mobile backhaul network, whereupon the gateway is configured to: (i) strip routing information associated with the packet received from the radio base station via the offload network and (ii) encapsulate a payload of the packet to cause the packet to be routed to the radio network;
wherein the radio base station is configured to, upon a determination that the packet is not eligible to be sent to the gateway via the offload network, cause the packet to be routed over the mobile backhaul network to the gateway.

8. The radio access network of claim 7, wherein the radio base station is configured to determine whether the packet is eligible to be sent to the gateway via the offload network based on the radio bearer identification associated with the packet.

9. The radio access network of claim 7, wherein the radio base station is configured to determine whether the packet is eligible to be sent to the gateway via the offload network based on the radio bearer type associated with the packet.

10. The radio access network of claim 9, wherein the radio base station is configured to determine that the packet is not eligible to be sent to the gateway via the offload network when the radio bearer type is a default bearer type.

11. The radio access network of claim 7, wherein the router includes a label edge router (LER) and the offload network includes a multiprotocol label switching (MPLS) virtual link between the gateway and the radio base station.

12. The radio access network of claim 11, wherein the router is further configured to perform label stacking to send the packet to the gateway using MPLS.

13. A radio base station to provide offloading from a mobile backhaul network to an offload network, the radio base station comprising:
an interface configured to receive a packet from a mobile device over a radio network; and
one or more computer processors configured to: (i) determine, based on at least one of a radio bearer type associated with the packet and a radio bearer identification associated with the packet, whether the packet is eligible to be sent to a gateway via the offload network instead of the mobile backhaul network, wherein the mobile backhaul network is operatively connected to the radio base station and the gateway; and (ii) upon a determination that the packet is eligible to be sent to the gateway via the offload network, initiate provision of the packet to a router that is configured to add routing information to the packet to cause the packet to be routed over the offload network to the gateway, thereby bypassing the mobile backhaul network; whereupon the gateway is configured to: (i) strip routing information associated with the packet received from the radio base station via the offload network; and (ii) encapsulate a payload of the packet to cause the packet to be routed to the radio network;
wherein the radio base station is configured to, upon a determination that the packet is not eligible to be sent to the gateway via the offload network, cause the packet to be routed over the mobile backhaul network to the gateway.

14. The radio base station of claim 13, wherein the base station is configured to determine whether the packet is eligible to be sent to the gateway via the offload network based on the radio bearer identification associated with the packet.

15. The radio base station of claim 13, wherein the base station is configured to determine whether the packet is eligible to be sent to the gateway via the offload network based on the radio bearer type associated with the packet.

16. The radio base station of claim 15, wherein when the radio bearer type is a default bearer type, the radio base station is configured to determine that the packet is not eligible to be sent to the gateway via the offload network.

17. The radio base station of claim 16, wherein the router includes a label edge router (LER) and the offload network includes a multiprotocol label switching (MPLS) virtual link between the gateway and the radio base station.

18. The radio base station of claim 17, wherein the base station is configured to determine whether the packet is eligible to be sent to the gateway via the offload network based further on the radio bearer identification associated with the packet.

19. The radio base station of claim 18, wherein the one or more computer processors are further configured to perform label stacking to send the packet to the gateway using MPLS, wherein the default bearer type includes, in respective instances: (i) an Iu type and (ii) an S1 type.

20. The radio base station of claim 19, wherein the packet comprises an uplink packet.

* * * * *